Aug. 11, 1959  H. V. KINDSETH  2,899,347
METHOD OF MAKING BAG CLOSURE
Filed July 21, 1954  2 Sheets-Sheet 1

INVENTOR.
HAROLD V. KINDSETH
BY
ATTORNEYS

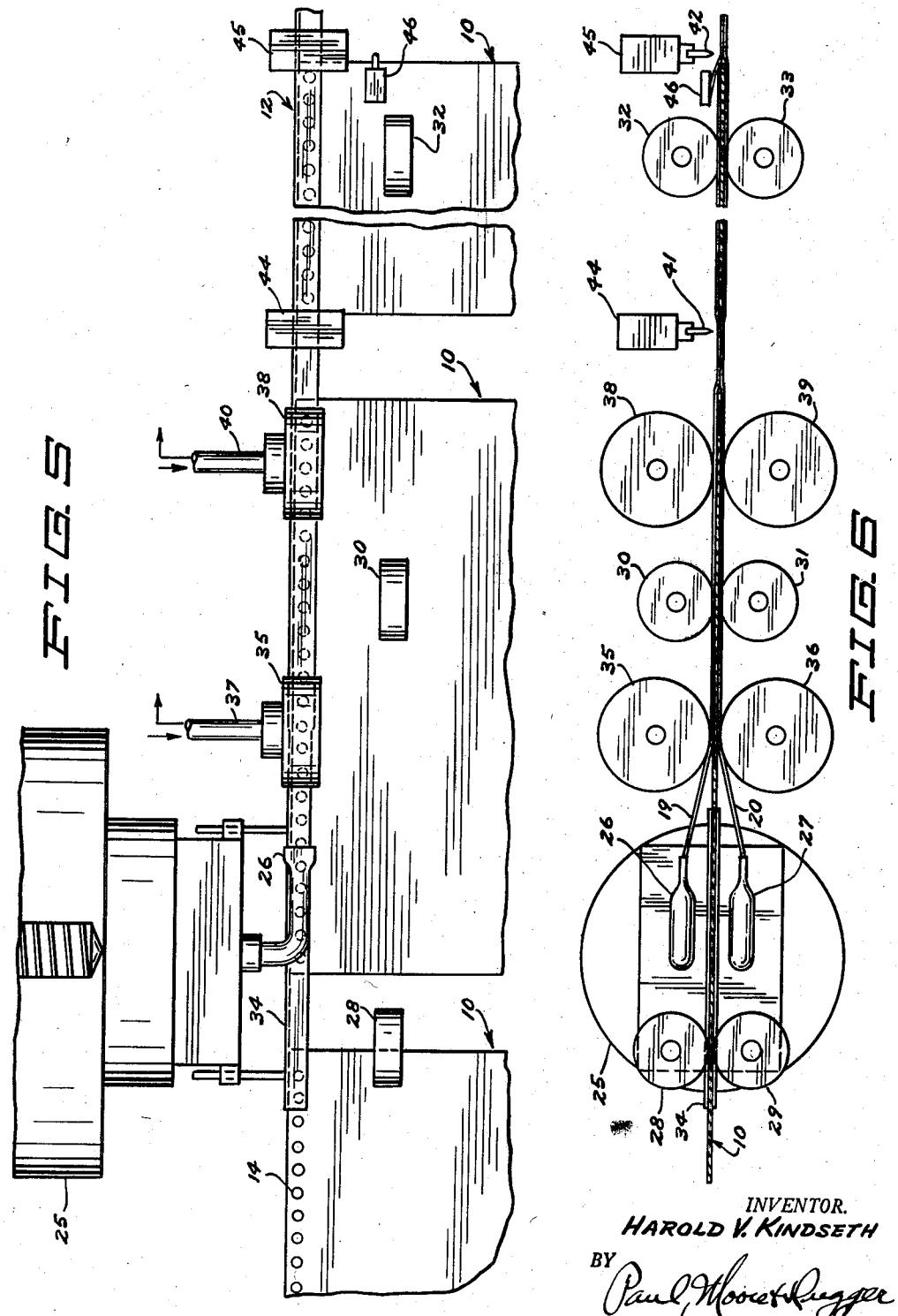

United States Patent Office 2,899,347
Patented Aug. 11, 1959

2,899,347

METHOD OF MAKING BAG CLOSURE

Harold V. Kindseth, Minneapolis, Minn., assignor to Bemis Bro. Bag Company, Minneapolis, Minn., a corporation of Missouri Application July 21, 1954, Serial No. 444,828

4 Claims. (Cl. 154—102)

This invention relates to bag closures. More particularly, this invention relates to an improved method of closing the ends of tubular bodies with thermoplastic resinous sealing elements bonded through perforations in the ends of the tubular bag blanks.

The principal object of this invention is to provide an improved end closure for tubular bags by perforating the ends of the bag blanks, extruding thermoplastic resinous sealing elements on both sides of the bag ends and forcing the resinous material through the perforations to bond with itself to form a secure end on the bags.

Another object of this invention is to provide a continuous extrusion and sealing process for extruding a thermoplastic resinous sealing element on both sides of a perforated tubular bag blank and then rolling or pressing to force the resinous material through the perforations and sealing the bag end.

It is another object of this invention to provide a thermoplastic resinous bag closure having straight knurls in the direction of the length of the bag for the purpose of improving the lateral flexibility of the closure.

A still further object of this invention is to provide a method of making a bag closure wherein two continuous thermoplastic resinous tapes are extruded on either side of a perforated tubular bag blank and pressed together to bond them through the perforations.

A further object of this invention is to provide a method of closing bag ends wherein a continuous U or V-shaped thermoplastic resinous sealing element is extruded around the end of a tubular bag blank having perforations punched along the end, and the sealing element is pressed together to cohere through the punched perforations and form a secure closure.

A still further object of this invention is to provide a method of forming bag closures wherein a tape of thermoplastic resinous material is extruded along one end of a tubular bag blank having holes punched along that end and is folded over the end of the bag and subjected to pressure to bond to itself through the punched holes.

Other objects of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by means of the drawings, in which the same numerals refer to corresponding parts and in which:

Figure 5 is a diagrammatic top plan view of one form of apparatus for forming bag closures according to this invention;

Figure 6 is a diagrammatic side elevation of the apparatus shown in Figure 5.

Figure 1:
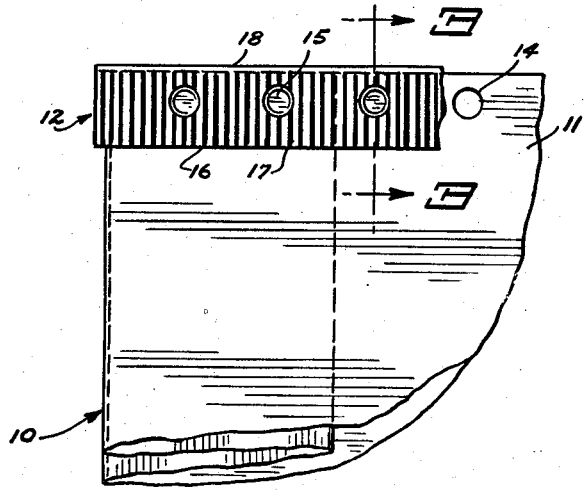
Figure 1 is a plan view of a fragment of a multi-wall tubular paper bag blank having one end closed and sealed in accordance with this invention.

Referring now to the drawings and particularly to Figure 1, there is here illustrated a portion of a bag, indicated generally at 10, formed from a tubular bag blank 11 having one end thereof sealed with a thermoplastic resinous sealing element, indicated generally at 12. The bag is of the general tubular type made from sheet material, such as paper, usually having multi-ply walls for added strength and in-folded along the opposite sides to provide expandability. It is to be understood at the outset, however, that the bag closure of this invention is not limited to bags of any particular construction or material, but on the contrary, is adaptable to closing bags of many types, sizes and materials. As shown, the open ends of the tubular bag blank 11 have been punched adjacent their edges to provide a plurality of spaced apart holes or perforations 14 through which the opposing inner surfaces of the resinous sealing material cohere. The number, size, shape, pattern of disposition and spacing of perforations 14 may, of course, be varied widely, depending upon a variety of circumstances, such as the general size and shape of the bag, the strength required of the closure, the nature of the material to be contained within the bag and the like. Thus, instead of providing a single row of perforations, there may be a double row with the perforations staggered as between one row and the other. The perforations should be closer together where the material to be contained in the bag is fine, but they may be farther apart where the material is coarse or granular. The greater area of bonding of the resinous material, the greater will be the strength of the seal, so long as the number or size of the holes do not unduly weaken the strength of the bag blank.

The sealing element 12 is formed of thermoplastic resinous material and is subjected to pressing while in a softened condition, so as to cause the opposing faces through the perforations 14 to at least partially or wholly fuse or bond at spots 15 to form a rivet-like fastening holding the plys of the bag blank together. The sealing element is preferably provided with a series of knurls in the form of alternating ridges 16 and valleys 17 in the direction of the bag length to enhance the lateral flexibility of the closure. In the preferred form of the invention, the sealing member 12 also extends beyond the ends of the bag blank, and is bonded to itself to provide a continuous tight seal 18 across the ends of the bag.

Figure 3:
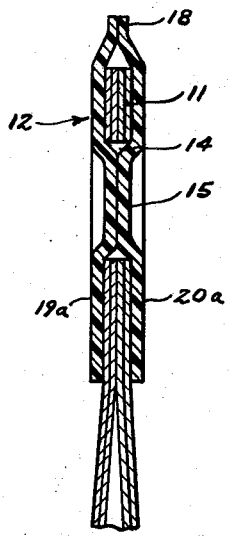
Figures 2, 3 and 4 are enlarged vertical sections taken generally along the line 3—3 of Figure 1 and in the direction of the arrows and showing several forms of the resinous bag closure of this invention.
Figure 2:
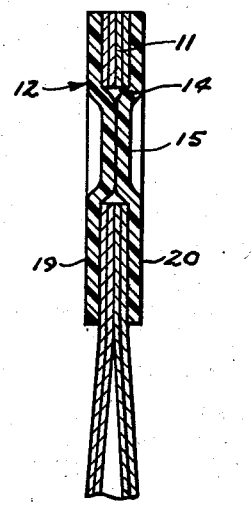
Figure 4:
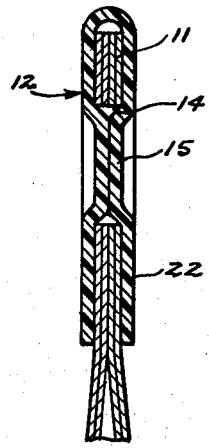

There are shown in Figures 2, 3 and 4 several forms which the closure of this invention may take. In its simplest form, as shown in Figure 2, the closure 12 may be made up of two individual tapes 19 and 20 formed of thermoplastic resinous material and pressed together through holes 14 while softened, so as to form the welded spots 15. The tapes are preferably extruded and subjected to pressure by rolling through corrugated rollers while still in a softened condition. Alternatively, the tapes may be preformed and subjected to sufficient heat while under pressure to soften them and cause partial fusion and bonding. The thus closed bags are then preferably passed between cooled rollers and are then ready for immediate use or shipment, there being no delay while waiting for adhesive to set or dry or the like.

A preferred form of the invention is shown in Figure 3. This bag closure is likewise formed from two separate tapes 19a and 20a of thermoplastic resinous material pressed and bonded together at spots 15 through perforations 14. This form of bag closure differs from that shown in Figure 2, only in that the tapes extend over the edge of the bag blank 11 and form a continuous tight bonded sift-proof seal 18 along the edge of the bag. This form of closure is especially desirable where the material to be contained within the bag is finely ground or powdery, or hygroscopic or requiring a hermetic seal for protection against moisture or atmospheric conditions.

Figure 4 illustrates still another form of closed end bag seal which may be made in one of several ways. According to this form of the invention, the bag closure 12 is made in a single continuous piece. This may be done by extruding a continuous U or V-shaped strip 22 of the resinous material around the punched end of the bag blank and pressing and sealing in the manner heretofore described. Alternatively, the closure may be formed from a continuous wide tape initially applied to one side only of the bag and then folded over the bottom of the bag end and pressed to bond the resinous material to itself through the punched holes.

Figure 7:
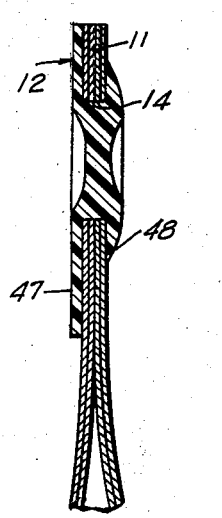
Figure 7 is an enlarged vertical section similar to Figures 2, 3 and 4 showing a further modified form of bag closure according to this invention.

Still another form which the invention may take is the formation of rivet-like sealing means through the punched holes of the bag blank from one side only, as shown in Figure 7. According to this method, a somewhat thickened strip of thermoplastic resinous material 47 is applied to one side only of the bag blank and is squeezed through the punched holes 14 and onto the opposite face around the holes. In this manner, the resinous material on one side of the closure is in the form of a continuous strip and is bonded to itself on the opposite side through the perforations, the resinous material on the opposite side being discontinuous. Desirably, the thickened resinous tape may be squeezed through the perforations into concave areas in registry with the perforations to form rivet beads or heads 48 on the opposite side of the bag blank. The bag may then be passed through flattening and corrugating rollers to complete the bag closure. It will be understood that depending upon the size and spacing of the perforations and the thickness of the resinous tape applied in this manner and the pressure exerted upon it, it is possible that the resinous material squeezed through to the opposite side of the bag blank may also be continuous, or substantially so, in the finished bag closure.

There is shown in Figures 5 and 6 one form of apparatus for applying the bag closure of this invention to bags by a continuous extrusion operation. The apparatus comprises a conventional screw feed plastic extruder 25 having dies 26 and 27 constructed to form two identical resinous strips 19 and 20 emerging at right angles to the direction of the screw of the extruder and in the direction of movement of the bags. The bags to be sealed are supported and guided through the apparatus by pairs of feed and guide rolls 28 and 29, 30 and 31, 32 and 33, and by adjustable side guides 34 at a proper angle to lay the resinous strips evenly across the width of the bag. The bags are carried at a predetermined speed between the two ribbons 19 and 20 of hot soft resinous material extruded from the dies 26 and 27.

A pair of suitable pinch rolls 35 and 36 rotating at the same speed as the feed rolls are located immediately following the extrusion die. These pinch rolls flatten out the soft resinous ribbons and force the still hot resinous material through the holes in the bag fusing the resinous tapes together by a riveting or spot welding action. To prevent the hot resinous tapes from adhering to the pinch rolls, the rolls are cooled, as for example, by circulating water or other cooling liquid through pipe 37 to the rolls. A second pair of cooling rolls 38 and 39, fed with cooling liquid through a pipe 40, are provided to cool and set the resinous strips so the bags may be handled without deforming the closure. The rolling surfaces of pinch rolls 35 and 36 and cooling rolls 38 and 39 are preferably corrugated longitudinally to form knurls in the resinous closure.

It will be apparent that the thickness of the sealing strip on either side of the bag end is determined by the relationship between the rate at which the sealing strip is extruded onto the bag end and the amount of pressure exerted by the pinch rolls.

After the bag closure has cooled sufficiently, the individual bags are severed from the continuous resinous tape. The cuts are made adjacent to the sides of the bag as close to the bag as is practical, while still maintaining a good seal. The tape may be cut automatically by solenoid or air operated knives 41 and 42, the solenoids 44 and 45 being actuated by micro-switch 46 which is tripped by the advancing bag. Alternatively, the resin strip between the bags may be cut off by roller pressure or impingement. This has the added advantage of sealing and reinforcing the end edges of the resin closure.

It will be apparent that by merely changing the extrusion die, this apparatus may be adapted to apply any of the disclosed forms of the bag closure. Similarly, by adjusting the positions of the guides, pinch rolls and knives, the apparatus is adaptable to the closing of any bag size. Obviously, the closure of this invention may be applied to close filled bags as well as to close one end of empty bag blanks.

The bag closure may be made of any reasonably durable flexible thermoplastic resinous material capable of being extruded and bonding to itself while soft. A wide variety of useful materials are available for this purpose, including, but by no means limited to, polyethylene, polyvinyl chloride, polyvinyl acetates, vinyl chloride-vinyl acetate copolymers, cellulose esters and ethers, butadiene-acrylonitrile copolymers, butadiene-styrene copolymers, polystyrene and the like. Although it is desirable that the resinous material adhere to and partially impregnate the bag blank, it is by no means necessary that it do so, so long as it bonds to itself through the perforations to form the rivet-like fastening.

As many widely apparently different embodiments of this invention may be made without departing from the spirit and scope thereof, it is to be understood that I do not limit myself to the specific embodiments herein.

I claim as my invention:

1. A method of providing a unitary bag closure which comprises punching a row of spaced apart perforations in at least one cut end of a tubular bag blank adjacent to the end edge thereof, continuously extruding a strip of hot softened thermoplastic resinous material to opposite sides of said perforated bag end over the perforations, pressing said thermoplastic resinous material through said perforations while said strip is in a heat softened condition to bond the resinous material to itself and thereafter trimming the ends of said strip beyond the side edges of the bag.

2. A method according to claim 1 further characterized in that said heat softened strip is pressed by rolling and a plurality of closely spaced alternate parallel ridges and grooves are impressed in said resinous material in the direction of the bag length.

3. A method according to claim 1 further characterized in that said resinous material is extruded to extend beyond the edges of the perforated bag end and is pressed and bonded together to produce a hermetic seal.

4. A method according to claim 3 further characterized in that said resinous material is extruded in the form of a ribbon to one side only of said perforated bag end and is folded over the bag end to said opposite side while the resinous material is still hot and soft and before pressing the resinous material to bond it to itself through the perforations.

References Cited in the file of this patent

UNITED STATES PATENTS

| | | |
|---|---|---|
| 1,736,181 | Weiss | Nov. 19, 1929 |
| 2,195,740 | Salfisberg | Apr. 2, 1940 |
| 2,391,938 | Baker | Jan. 1, 1946 |
| 2,403,756 | Read | July 9, 1946 |
| 2,622,053 | Clowe | Dec. 16, 1952 |
| 2,676,704 | Marks | Apr. 27, 1954 |